United States Patent
Kubota et al.

(10) Patent No.: US 9,835,772 B2
(45) Date of Patent: *Dec. 5, 2017

(54) LENS ARRAY AND IMAGE FORMING APPARATUS

(71) Applicant: TOSHIBA TEC KABUSHIKI KAISHA, Tokyo (JP)

(72) Inventors: Atsushi Kubota, Sunto Shizuoka (JP); Ryozo Akiyama, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/427,378

(22) Filed: Feb. 8, 2017

(65) Prior Publication Data

US 2017/0176648 A1 Jun. 22, 2017

Related U.S. Application Data

(62) Division of application No. 14/667,103, filed on Mar. 24, 2015, now Pat. No. 9,599,755.

(30) Foreign Application Priority Data

Mar. 24, 2014 (JP) ................. 2014-059933

(51) Int. Cl.
*G02B 3/00* (2006.01)
*G02B 5/00* (2006.01)
*B41J 11/00* (2006.01)
*G02B 1/04* (2006.01)

(52) U.S. Cl.
CPC ........... *G02B 3/0006* (2013.01); *B41J 11/002* (2013.01); *G02B 1/041* (2013.01); *G02B 3/0012* (2013.01); *G02B 3/0068* (2013.01); *G02B 5/003* (2013.01)

(58) Field of Classification Search
CPC ...... G02B 3/0006; G02B 1/041; G02B 5/003; G02B 3/0068; G02B 3/0012; B41J 11/002
See application file for complete search history.

(56) References Cited

U.S. PATENT DOCUMENTS

| 6,100,009 A | 8/2000 | Obayashi et al. |
| 7,375,145 B2 | 5/2008 | Akiyama et al. |
| 9,599,755 B2* | 3/2017 | Kubota ............... G02B 5/003 |
| 2013/0235451 A1* | 9/2013 | Kubota ............... G02B 3/005 359/355 |

FOREIGN PATENT DOCUMENTS

| JP | 2001-330709 | 11/2001 |
| JP | 2002-258411 | 9/2002 |

* cited by examiner

*Primary Examiner* — Henok Legesse
(74) *Attorney, Agent, or Firm* — Patterson & Sheridan, LLP

(57) ABSTRACT

A lens array comprises a plurality of lenses disposed on a transparent substrate, and a light-shielding film disposed on the transparent substrate around the plurality of lenses, wherein the light-shielding film comprises a cured uv-curable ink containing a thermal acid generator. A method of manufacturing a lens array includes forming a plurality of lenses on a transparent substrate, depositing a uv-curable ink on the transparent substrate around the plurality of lenses, and curing the uv-curable ink to form a light-shielding film disposed on the transparent substrate around the plurality of lenses, wherein the inside of the light-shielding film is heated after the uv-curable ink is cured.

14 Claims, 10 Drawing Sheets

FIG.1
(a)
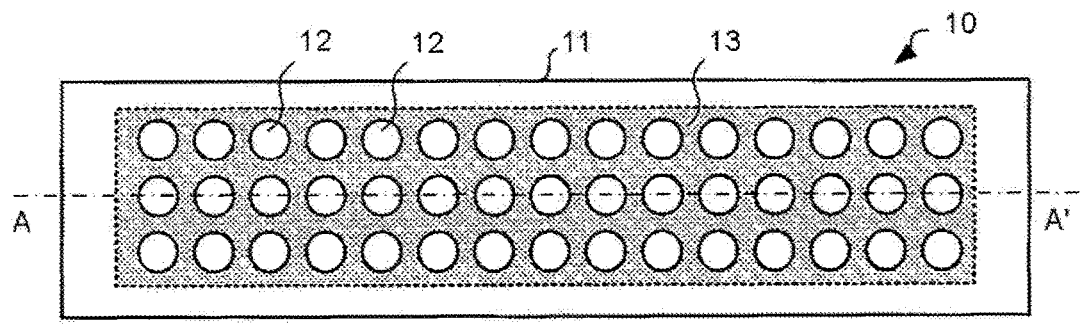
(b)
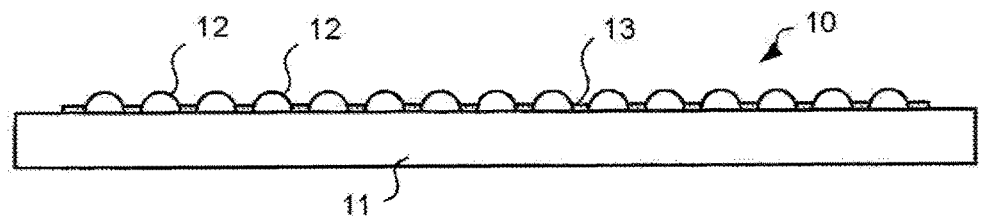
(c)
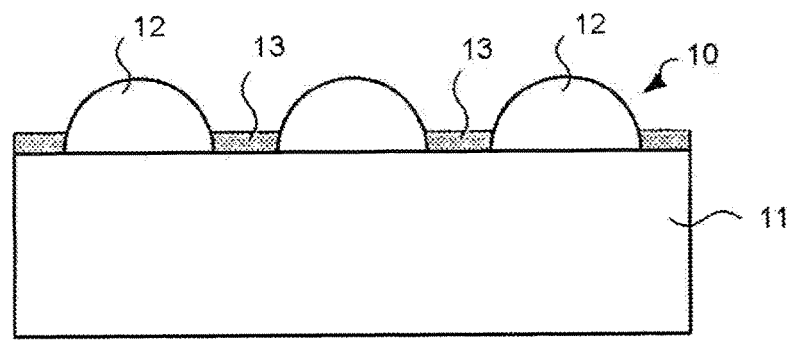

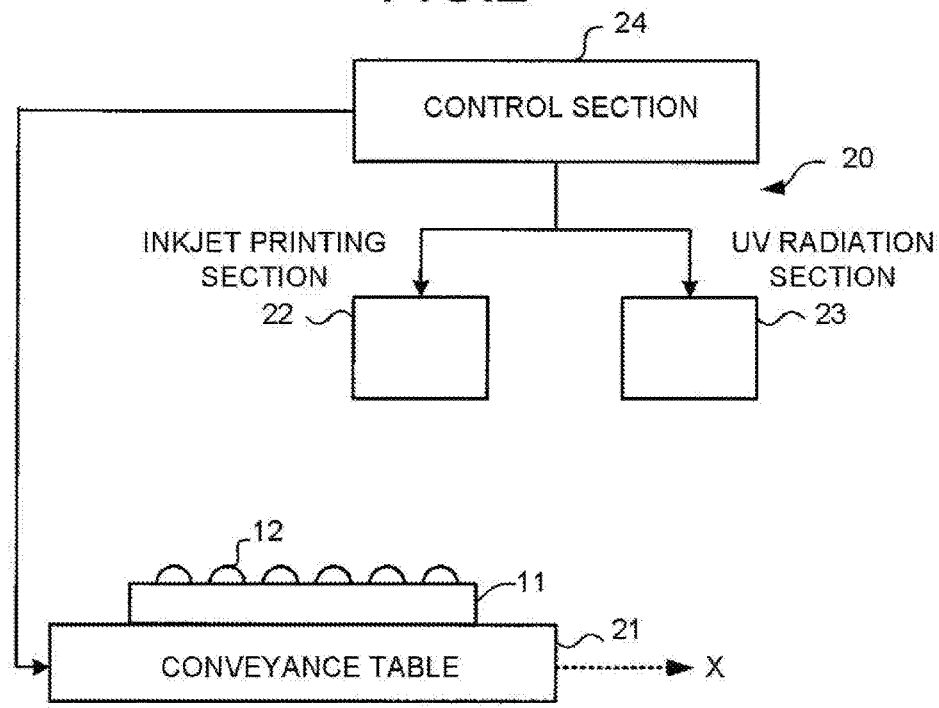
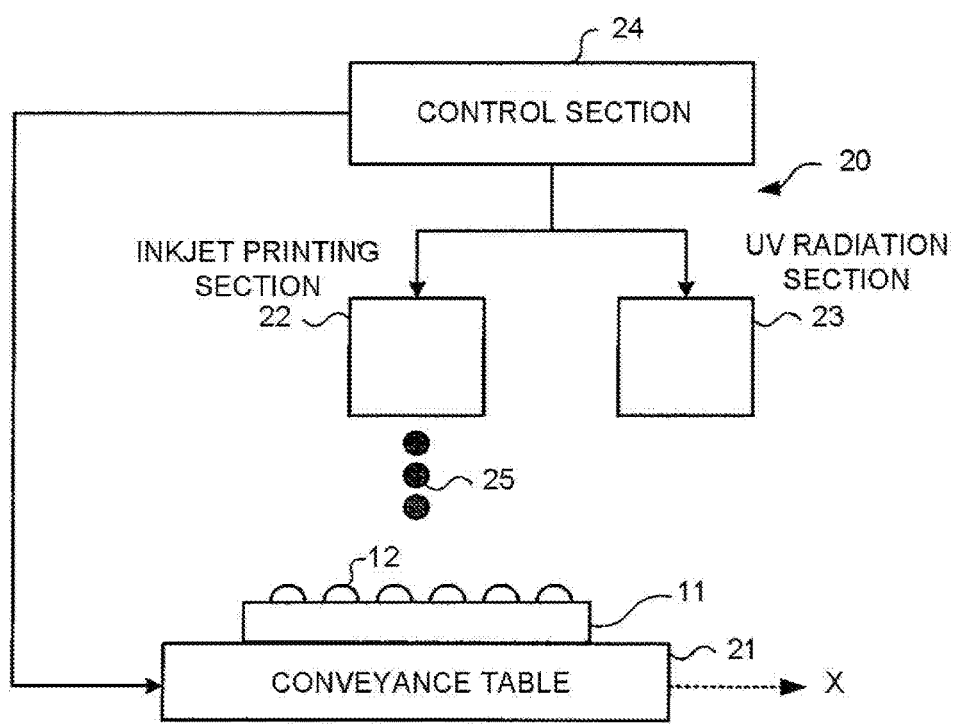

| SHADING INK | LIGHT-SHIELDING MATERIAL | REACTIVE POLYMERIZED COMPOUND | | PHOTO-ACID-GENERATING AGENT | SENSITIZER | THERMAL ACID GENERATOR |
|---|---|---|---|---|---|---|
| | CARBON BLACK PIGMENT | C3000 | C2021 | ESACURE1064 | DBA | CXC-1738 |
| No.1 | 7 | 60 | 22 | 10 | 1 | 0 |
| No.2 | 7 | 50 | 32 | 10 | 1 | 0 |
| No.3 | 7 | 60 | 22 | 10 | 0 | 1 |
| No.4 | 7 | 50 | 32 | 10 | 0 | 1 |
| No.5 | 7 | 61 | 23 | 8 | 0 | 1 |
| No.6 | 7 | 63 | 23 | 6 | 0 | 1 |
| No.7 | 7 | 62 | 23 | 6 | 0 | 2 |
| No.8 | 7 | 61 | 23 | 6 | 0 | 3 |
| No.9 | 7 | 63 | 24 | 6 | 0 | 0 |
| No.10 | 10 | 60 | 22 | 8 | 0 | 0 |
| No.11 | 10 | 59 | 22 | 8 | 0 | 1 |
| No.12 | 10 | 59 | 20 | 10 | 1 | 0 |

UNIT%

| SHADING INK | IMMEDIATELY AFTER UV RADIATION | RADIATION AT 60°C FOR 10MIN | STORE AT ROOM TEMPERATURE FOR ONE DAY | STORE AT ROOM TEMPERATURE FOR TWO DAYS |
|---|---|---|---|---|
| No.1 | 3B | 3B | 2B | B |
| No.2 | 3B | 3B | 3B | B |
| No.3 | 4B | 4B | 2B | B |
| No.4 | 4B | 4B | 2B | B |
| No.5 | 4B | 4B | 3B | B |
| No.6 | 4B> | 4B> | 3B | B |
| No.7 | 4B> | 4B> | 3B | 2B |
| No.8 | 4B> | 4B> | 4B | 2B |
| No.9 | 4B> | 4B> | 4B | 4B |
| No.10 | 4B> | 4B> | 4B | 4B |
| No.11 | 4B> | 4B> | 4B | 2B |
| No.12 | 4B> | 4B> | 4B | 4B |

FIG.8

| SHADING INK | FILM THICKNESS | IMMEDIATELY AFTER UV RADIATION | RADIATION AT 60°C FOR 10MIN | STORE AT ROOM TEMPERATURE FOR ONE DAY | STORE AT ROOM TEMPERATURE FOR TWO DAYS |
|---|---|---|---|---|---|
| No.1 | 10μm | 3B | 2B | 2B | B |
| | 15μm | 4B> | 4B> | 4B | 4B |
| No.5 | 10μm | 4B | 4B | 3B | B |
| | 15μm | 4B> | 4B> | 3B | 2B |
| No.11 | 10μm | 4B> | 4B> | 4B | 2B |
| | 15μm | 4B> | 4B> | 4B | 3B |

… (1)

LENS ARRAY AND IMAGE FORMING APPARATUS

CROSS-REFERENCE TO RELATED APPLICATION

This application is a division of U.S. patent application Ser. No. 14/667,103, filed on Mar. 24, 2015, which is based upon and claims the benefit of priority from Japanese Patent Application No. 2014-059933, filed on Mar. 24, 2014, the entire contents of each of which are incorporated herein by reference.

FIELD

Embodiments described herein relate generally to a lens array in which a light-shielding film is formed around lenses using uv-curable ink and an image forming apparatus.

BACKGROUND

Conventionally, in an image forming apparatus such as a printer, copier, multi-function peripheral (MFP), facsimile, scanner and the like, or in a liquid crystal display device, solid-state image capturing element, confocal laser microscope and the like, a lens array is used. The lens array is equipped with a light-shielding film at the non-lens parts to prevent stray light. Not limited to the image display field, the application field of the lens array further includes optical communication field, optical disk field, image transmission and combination field, light measurement and light sensing field, light processing field and the like. As the lens array, a high-quality (high-resolution) lens array with no stray light is required.

A microlens array integrally formed with a light-shielding section is disclosed in Japanese Unexamined Patent Application Publication No. 2001-330709 in which a plurality of microlenses is formed on a transparent substrate, and a light-shielding film is formed with ink material between each microlens using an inkjet method.

The microlens array disclosed in Japanese Unexamined Patent Application Publication No. 2001-330709 is manufactured using a mold through an injection molding method. Next, black ink is ejected between each lens element through an inkjet method to spread the ink between each lens. Herein, the ink has moderate flowability, thus, the ink can spread naturally to the narrow parts between the lenses. The used ink may be solid ink, oil-based ink, water-based ink, uv-curable ink and electron beam curing ink.

However, in a case of solid ink, it is necessary to arrange a heating module for carrying out heating processing so that the solid ink has moderate flowability between the lenses, and therefore the resin material of the microlens array is limited. In the case of oil-based ink or water-based ink, it is necessary to evaporate and dry the solvent thereof, and the resin material of the microlens array is limited due to the drying module. Further, in the process of drying the solvent, the light-shielding material such as pigment and the like flows, which makes it difficult to form an even light-shielding film. In a case of electron beam curing ink, the size of the device is increased for the reason of safety. Thus, the ink mentioned above has an effect on the manufacture cost, and the material and the performance are restricted.

On the other hand, the uv-curable ink also shields the ultraviolet due to the characteristic of the light-shielding film of the microlens array, thus, it is difficult to obtain a sufficiently cured film, and the detailed curing method is not disclosed. That is, if the light-shielding property of the light-shielding film of the microlens array is improved, though the stray light and the like can be shielded, there is a problem that the curing energy cannot reach the depth direction of the light-shielding film during the UV curing process, and a film with a sufficient effect cannot be achieved.

BRIEF DESCRIPTION OF THE DRAWINGS

FIG. 1 is a diagram illustrating an example of lens array according to a first embodiment;

FIG. 2 is a diagram illustrating an example of a light-shielding film forming device of the lens array according to the first embodiment;

FIG. 3 is a diagram illustrating the ejection of uv-curable ink of the light-shielding film forming device according to the first embodiment;

FIG. 6 is a diagram illustrating the compounding ratio of shading ink according to the first embodiment;

FIG. 7 is a diagram illustrating the evaluation of the degree of cure of the shading ink according to the first embodiment;

FIG. 8 is a diagram illustrating the evaluation of the degree of cure of the shading ink when the coating thickness is changed;

DETAILED DESCRIPTION

Figure 4:
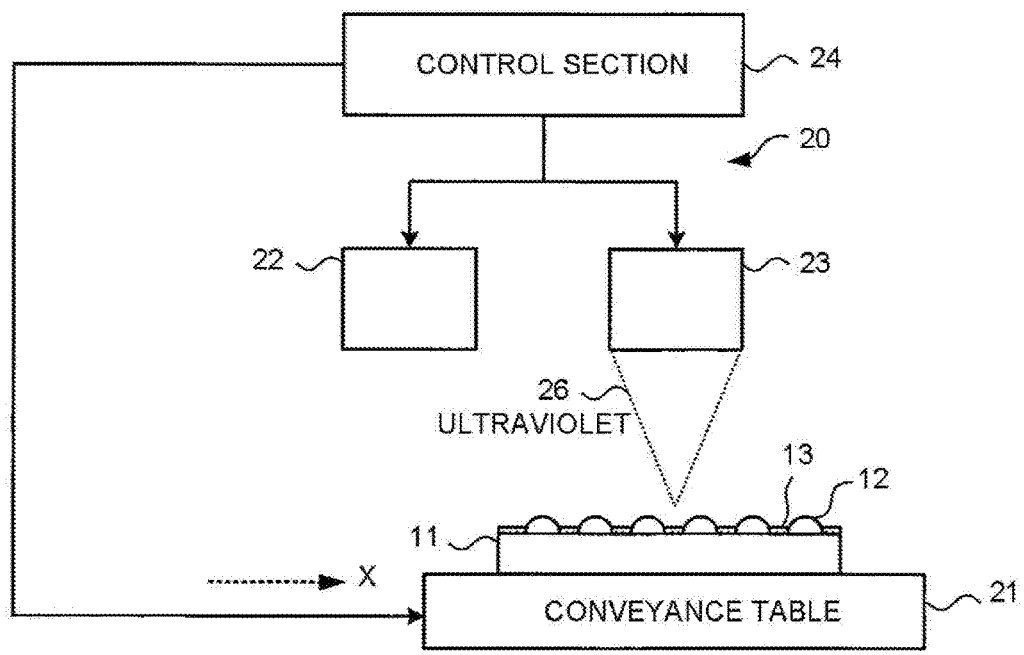
FIG. 4 is a diagram illustrating ultraviolet radiation of the light-shielding film forming device according to the first embodiment.

In accordance with one embodiment, a lens array comprises a plurality of lenses disposed on a transparent substrate, and a light-shielding film disposed on the transparent substrate around the plurality of lenses; wherein the light-shielding film comprises a cured uv-curable ink containing a thermal acid generator.

Hereinafter, embodiments of the present invention are described with reference to the accompanying drawings.

Further, the same components are indicated by the same reference numerals in the drawings and repetitive description is not provided.

A First Embodiment

First, the constitution of the lens array according to an embodiment is described with reference to FIG. 1. FIG. 1 is a diagram illustrating the constitution of a lens array 10, (a) is a plan view of the lens array 10, (b) is a cross-sectional view taken in the direction of arrows A-A' along the dot and dashed line shown in (a), and (c) is an enlarged diagram illustrating one part shown in (b).

As shown in FIG. 1, the lens array 10 (also referred to as microlens array) includes a plurality of lenses 12 arrayed on, for example, a transparent substrate 11. The lens array 10 forms, for example, a black light-shielding film 13 having a thickness of 12 µm between each lens 12. In this manner, the lens portion covered by the light-shielding film 13 is turned into a non-lens portion. The light-shielding film 13 is formed with uv-curable ink serving as shading ink according to the present embodiment. The substrate 11 and the lens 12 are formed through, for example, metal molding.

The higher the light-shielding property of the light-shielding film 13 shown in FIG. 1 (c) is, the better to the characteristic of the lens array 10. That is, the stray light can be shielded by the light-shielding film 13. The light-shielding property can be calculated by, for example, measuring a transmission density. The transmission density can be measured using, for example, 361T manufactured by X-rite Inc., and the transmitted light is almost shielded in a case in which the transmission density is higher than 6.

It is shown in FIG. 1 that the lenses 12 are arranged on one side of the substrate 11, however, the lenses 12 may be arranged on both sides of the substrate 11. In the following description, the lens array 10 and the light-shielding film 13 are collectively referred to as a lens array unit.

(Formation of Shielding Film)

For example, a light-shielding film forming device 20 equipped with an inkjet head is used in the formation of the light-shielding film 13. FIG. 2 is a diagram illustrating the schematic constitution of the light-shielding film forming device 20. As shown in FIG. 2, the light-shielding film forming device 20 is provided with a conveyance table 21 for conveying the lens array 10, an inkjet printing section 22 for ejecting uv-curable ink 25, a UV radiation section 23 and a control section 24 for controlling the inkjet printing section 22 and the UV radiation section 23.

The conveyance table 21 fixedly supports the lens array 10 including the transparent substrate 11 equipped with the plurality of lenses 12, and moves in a direction indicated by an arrow X to convey the transparent substrate 11 of the lens array 10 towards the position of the inkjet printing section 22 and the position of the UV radiation section 23. The control section 24 controls the conveyance speed and the conveyance timing of the conveyance table 21.

In the example shown in FIG. 2, the uv-curable ink is used to form the light-shielding film 13. The light-shielding material of the uv-curable ink is carbon black, and the weight of the light-shielding material is set to 3.5 percentage by weight (wt %). As to the UV radiation section 23, the illuminance is set to 2000 mW/cm$^2$, the cumulative light amount is set to 400 mJ/cm$^2$, and the wavelength is set to 365 nm; and the thickness of the light-shielding film 13 is set to 12 µm.

Hereinafter, the light-shielding film forming operation is described with reference to FIG. 3 through FIG. 5. As shown in FIG. 3, when the conveyance table 21 is moved and the transparent substrate 11 is conveyed to the position of the inkjet printing section 22, the inkjet printing section 22 ejects the uv-curable ink 25 to positions between each lens 12 from above the substrate 11. The control section 14 controls the amount of the ink ejected from the inkjet printing section 22 to positions between each lens 12 so that the thickness of the light-shielding film is, for example, 12 µm.

The ejection amount of the uv-curable ink 25 is controlled by, for example, adjusting the voltage applied for ejecting the ink. As another control method, the ejection amount of the uv-curable ink may be controlled by adjusting the number of droplets through a multi-drop printing process in which fine uv-curable ink droplets ejected from the inkjet printing section 22 are ejected to the same position for a plurality of times.

Next, as shown in FIG. 4, the control section 24 conveys the conveyance table 21 to the position of the UV radiation section 23, and the uv-curable ink 25 coated on the lens array 10 is cured by ultraviolet radiation 26 radiated from the UV radiation section 23. The control section 24 controls the radiation amount of the ultraviolet radiation 26, the wavelength of the ultraviolet radiation and the like. In this way, the light-shielding film 13 is formed at positions between the lenses 12.

Figure 5:
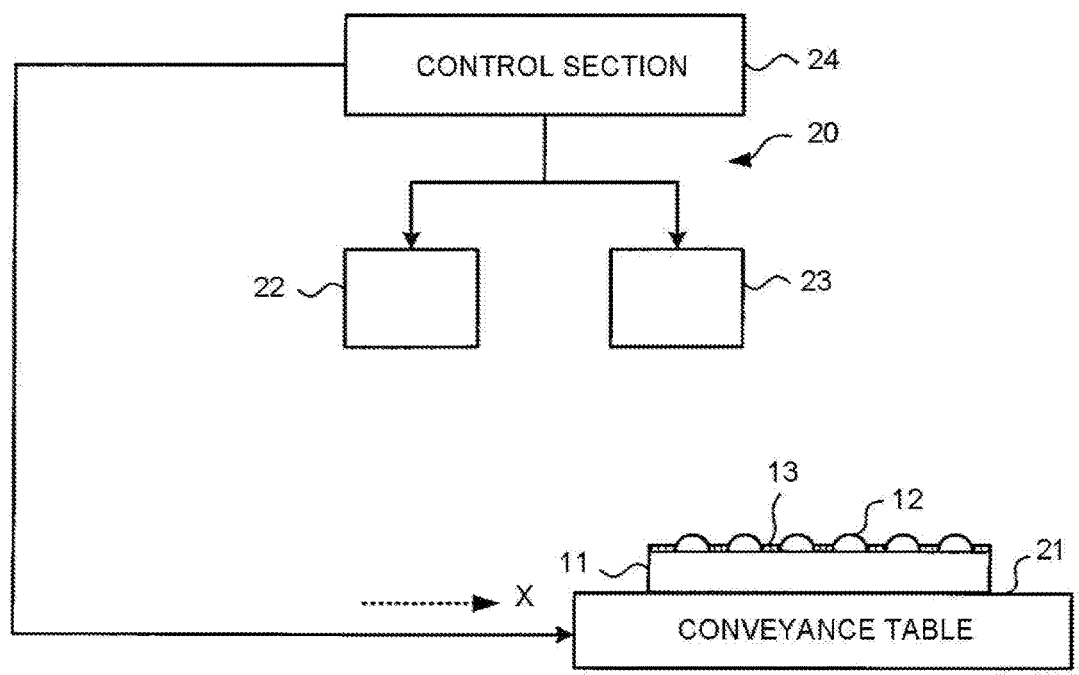
FIG. 5 is a diagram illustrating curing processing of the uv-curable ink of the light-shielding film forming device according to the first embodiment.

As shown in FIG. 5, the control section 24 conveys the conveyance table 21 to a position away from the UV radiation section 23. Then the conveyance table 21 is stopped in this state, thermal decomposition occurs in the thermal acid generator (described below), and the inside of the light-shielding film formed by the uv-curable ink can be cured.

In addition, the light-shielding film forming device 20, which is not limited to the inkjet type, can also supply the uv-curable ink through coating processing. Further, it is also applicable to fix the conveyance table 21 at a position, and move the inkjet printing section 22 and the UV radiation section 23 with respect to the lens array 10 instead. In the lens array 10 according to the embodiment described above, the lenses 12 are arranged on one side of the substrate 11, however, the lenses 12 may be arranged on both sides of the substrate 11.

In a case in which the lenses 12 are arranged on both sides of the substrate 11, after the light-shielding film 13 is formed on one side (front side), the substrate may be reversed and set on the conveyance table 21 to be subjected to the same operations to form the light-shielding film 13 on the other side (back side). It is also applicable to arrange a plurality of inkjet printing sections 22 and UV radiation sections 23, respectively. Further, the part of the conveyance table 21 where the transparent substrate 11 is fixed may be formed by, for example, a glass plate, and ultraviolet radiation may be radiated from the back side of the glass plate to cure the uv-curable ink 25 efficiently.

Further, it is desired that the time from the ink printing to the ink curing is longer than two seconds so that the ink can spread between the lenses 12. Thus, the conveyance table 21 may be stopped (to wait) for a certain time after the ink is ejected from the inkjet printing section 22.

Next, the uv-curable ink is described.

(Light-Shielding Material)

As the light-shielding material used to form the light-shielding film for the lens array, the optical light-shielding property and the reflection characteristic are the most important. The next important property is the dispersion stability, the flight performance as the characteristic of the inkjet uv-curable ink and the like; and a light-absorbing pigment may be listed as such a kind of material.

Example light-absorbing pigments include carbon-based pigment such as carbon black, carbon refined, carbon nanotube and the like; metal oxide pigment such as iron black, zinc oxide, titanium oxide, chromium oxide, iron oxide and the like; sulfide pigment such as zinc sulfide and the like; phthalocyanine pigment; pigment including salt such as phosphate, silicate, carbonate and sulfuric acid salt of metal; and pigment including metallic powder such as aluminum powder, bronze powder and zinc powder.

(Reactive Material)

The material serving as the skeleton of the light-shielding film, which is a light-curable material, includes a reactive material that is polymerized by light, such as oligomer and reactive monomer having a polymerizable functional group, and photoinitiator that initiates the polymerization of these materials. Next, a cation type reactive material used in the present embodiment is described.

The cation type reactive material, which may be, for example, cyclic ether compound represented by epoxy or oxetane compound, or vinyl ether compound having a vinyl ether group, serves as the photoinitiator for initiating the polymerization through proton generation based on light radiation. Within these compounds, the cyclic ether compound has the least volume shrinkage after being subjected to the polymerization, thus, the cyclic ether compound is excellent in the adhesion to the substrate. Further, the compound can carry out polymerization without oxygen inhibition, and has excellent thin film forming ability, which is also different from the radial type.

As the light-shielding film for microlens, a material which has both the characteristic described above and the ink characteristic of the inkjet uv-curable ink can be properly used. That is, no specific limitation is given to the ink material according to the present embodiment as long as the ink material meets the performance criteria such as the UV curing condition, cured film strength, reflection characteristic and light-shielding property as the light-shielding film; the physical property such as the viscosity and surface tension as the characteristic of the inkjet uv-curable ink; and the compatibility with the head member and the dispersion stability of the light-shielding material. The specific examples are described below.

The cation type material may be, for example, epoxy compound, oxetane compound, vinyl ether compound and the like.

The epoxy compound may be a compound that includes an epoxy group or alicyclic epoxy group on either or both of a hydrocarbon group having divalent aliphatic skeleton or alicyclic skeleton and a divalent group partially having aliphatic chain or alicyclic skeleton.

For example, alicyclic epoxy exemplified in Celloxide 2021, Celloxide 2021A, Celloxide 2021P, Celloxide 2081, Celloxide 2000 and Celloxide 3000 manufactured by Daicel Chemical Industries, Ltd.; CYCLOMER A200 and CYCLOMER M100 serving as (Meth) acrylate compound having an epoxy group; methacrylate having Methyl glycidyl group such as MGMA; glycidol serving as low-molecular-weight epoxy compound; β-methyl epichlorohydrin; α-pinene oxide; α-olefin monoepoxide of C12~C14; α-olefin monoepoxide of C16~C18; epoxidized soybean oil such as Daimakku S-300K; epoxidized linseed oil such as Daimakku L-500; and Multifunctional epoxy such as epolead GT301 and epolead GT401 and the like can be used.

Further, a compound obtained by replacing the hydroxyl-group end of low-molecular-weight phenolic compound, which is added with hydrogen and alicyclic epoxy manufactured by US Dow Chemical Company such as Cyracure, and is aliphatic, with a group having epoxy, glycidyl ether compound such as alicyclic alcohol/polyhydric aliphatic alcohol such as trimethylol propane, ethylene glycol or glycerin, and neopentyl alcohol or hexane diol, glycidyl ester of hexahydrophthalic acid and polyvalent carboxylic acid of hydrogenated aromatic and the like can be used.

As oxetane compound, for example, a compound in which more than one oxetane-containing group is guided into the alicyclic such as (Di[1-ethyl (3-oxetanyl)]methyl ether, 3-ethyl-3-oxetane (2 ethylhexyloxy methyl) oxetane, [(1-ethyl-3-oxetanyl) methoxy]cyclohexane, Bis [(1-ethyl-3-oxetanyl) methoxy] cyclohexane, or Bis [(1-ethyl-3-oxetanyl) methoxy] norbornane; an ether compound that dehydrates and condenses alcohol containing oxetane such as 3-ethyl-3-hydroxymethyl oxetane on aliphatic polyhydric alcohol such as neopentyl alcohol, ethylene glycol or propylene rubber recall can be used.

Further, as the oxetane compound containing aromatic skeleton, for example, 1,4-bis((1-ethyl-3-oxetanyl) methoxy) benzene; 1,3-bis ((1-ethyl-3-oxetanyl) methoxy) benzene; 4,4'-bis((3-ethyl-3-oxetanyl) methoxy)biphenyl; and phenol novolac oxetanes can be used.

As vinyl ether compound, 2-ethylhexyl vinyl ether, pummelo diol divinyl ether, cyclohexanedimethanol divinyl ether, cyclohexanedimethanol monovinyl ether, Di (ethyleneglycol)monovinylether, Di (ethyleneglycol) divinyl ether, hexanediol divinyl ether, triethylene glycol divinyl ether, 4-hydroxybutyl vinyl ether and the like can be used.

Further, in a case in which the decrease of viscosity and the improvement of curing hardness, as well as the improvement of curing speed are requested, it is preferred to formulate, separately or in combination, the vinyl ether compound represented in the following compound (1) in the liquid ink. As to the vinyl ether compound combined with the methylene group such as aliphatic glycol derivatives or cyclohexanedimethanol, the polymerization inhibition is significant due to the pigment, thus, it is difficult to be used as the ink.

However, the compound (shown by the following compound (1)) including vinyl ether group directly on the alicyclic skeleton, terpenoid skeleton, and the aromatic skeleton is excellent in the curing performance even if included together with the pigment at the same time. The amount of such a compound is preferred to be less than 50 parts by weight with respect to the entire liquid ink to maintain the thermoplasticity; however, in a case in which higher solvent resistance and hardness are required even if the thermoplasticity is impaired, the amount of the compound is further increased up to the entire amount of the solvent for curing with acid.

$$R13\text{-}R14\text{-}(R13)p \qquad (1):$$

In the compound (1) mentioned above, the R13, at least one of which is the vinyl ether group, indicates substituent selected from the vinyl ether group and hydroxyl group. The R14 is a p+1 monovalent group selected from alicyclic skeleton or a skeleton including aromatic ring, and p is positive integer including 0. However, in a case in which the R14 is cyclohexane ring skeleton and the p is 0, at least one carbon on the ring has a ketone structure. As the (p+1) monovalent organic group R14, for example, the (p+1) monovalent group containing benzene ring or naphthalene ring and biphenyl ring, and guided (p+1) monovalent group such as cycloalkane skeleton, norbornane skeleton, adamantane skeleton, tricyclodecane skeleton, tetracyclododecane skeleton, terpenoid skeleton, cholesterol skeleton and the like can be used.

More specifically, a compound obtained by replacing hydrogen atom of hydroxyl group in phenol derivative or alicyclic polyols such as cyclohexane (poly)ol, norbornane (poly)ol, tricyclodecane (poly)ol, adamantane (poly)ol, benzene (poly)ol, naphthalene (poly)ol, anthracene (poly)ol, biphenyl (poly)ol and the like with vinyl group can be used.

Further, a compound obtained by replacing hydrogen atom of hydroxyl group in polyphenolic compound such as polyvinyl phenol and phenol novolac with vinyl group can be used. The compound mentioned above is desirable because volatility is reduced even if part of the hydroxyl group remains or even if the part of the methylene atom of the alicyclic skeleton is replaced with ketone group and the like. Specifically, in a case in which cyclohexyl mono vinyl ether compound is used because it is rich in volatile, it is desired that cyclohexane ring is oxidized at least in cyclohexanone ring.

Next, general materials used in the cationic are listed as examples of a photoinitiator.

Onium salt, diazonium salt, quinonediazide compound, organohalogen compound, aromatic sulfonate compound, bisulfone compound, sulfone compound, sulfonate compound, sulfonium compound, sulfamide compound, iodonium compound, sulfonyl diazomethane compound, and the mixture of these materials may be used as the cationic.

Specifically, triphenyl sulfonium triflate, diphenyl iodonium triflate, 2,3,4,4-tetra-hydroxy benzophenone-4-naphthoquinone diazide sulfonate, 4-n-phenyl-amino-2-methoxy-phenyl diazonium sulfate, 4-n-phenyl-amino-2-methoxy-phenyl diazonium p-ethyl phenyl sulfates, 4-n-phenylamino-2-methoxy-phenyl diazonium 2-naphthylsulfate, 4-n-phenyl-amino-2-methoxy-phenyl diazonium phenyl sulfates, 2,5-diethoxy-4-n-4'-methoxy-phenyl carbonyl phenyl diazonium-3-carboxy-4-hydroxy-phenyl sulfates, 2-methoxy-4-n-phenyl diazonium-3-carboxy-4-hydroxy-phenyl sulfates, diphenyl sulfonyl methane, diphenyl sulfonyl diazomethane, diphenyl sulfone, α-methyl benzoin tosylate, pyrogallol mesylate, benzoin tosylate and the like can be listed.

Next, the thermal acid generator is described. The thermal acid generator, which generates acid through heat, and promotes the curing of ink, is preferred to be a compound of which the thermal decomposition point is higher than 50 degrees centigrade. The thermal acid generator may be, for example, a compound that generates acid with low nucleophilicity, such as disulfonylimide, carboxylic acid, or sulfonic acid by heating. These materials are selected on condition that the thermal decomposition point thereof is below the glass transition point of the material forming the lens array. Further, the thermal acid generator is thermally decomposed gradually if placed at room temperature, thus, it is desired to store the thermal acid generator at a cold, dark place when put the thermal acid generator into the uv-curable ink.

A specific example of the thermal acid generator is described. The thermal acid generator may be lewis acid, such as boron trifluoride diethyl ether complex, boron trifluoride amine complex, aluminum chloride, titanium tetrachloride, tin tetrachloride, iron chloride (III), zinc chloride and the like; onium salt such as ammonium salt, sulfonium salt, oxonium salt, phosphonium salt, benzyl onium salt; and phosphoric acid amide ester and the like.

To create the uv-curable ink for the light-shielding of the microlens with these materials, the process of dispersing the light-shielding material to the monomer; the process of mixing and stirring the obtained dispersion together with proper monomer, oligomer, photoinitiator, thermal acid generator, and polymerization inhibitor added as needed; and finally the purification process such as centrifugation or filtration for removing coarse particle and unwanted solids are carried out to create the inkjet uv-curable ink.

Hereinafter, a specific example of the uv-curable ink 25 of the present embodiment is described in detail.

[Preparation of Light-Shielding Material Dispersion]

The following light-shielding material, dispersant, and reactive polymerized compound serving as solvent are mixed to obtain mixtures different in the compounding ratio of the light-shielding material. Carbon black pigment is used as the light-shielding material.

> light-shielding material (carbon black pigment) 20.0 wt %
> dispersant (Avecia Solsperse 32000) 5.5 wt %
> dispersant (Avecia Solsperse 22000) 0.7 wt %
> reactive polymerized compound (Daicel C3000:limonene oxide) 73.8 wt %

Beads having a diameter of 0.5 mm are filled into a circulation type sand mill to subject the obtained mixture to a dispersing processing for about an hour. After the dispersing processing, the coarse particle is removed with a filter having a pore diameter of 5 μm to obtain the light-shielding material dispersion of the carbon black pigment. In addition, the inkjet ink is described as an example in the present embodiment, thus, the processing for reducing the average particle diameter and sharpening the particle size distribution is carried out through the filter; however, in a case in which the inkjet ink is not used, the filter processing can be omitted.

[Preparation of Shading Ink]

The reactive polymerized compound, photo-acid-generating agent, thermal acid generator and sensitizer are blended with the prepared light-shielding property dispersion, and then these materials are mixed and stirred with a stirrer such as a homogenizer for about an hour. The obtained mixture is filtered by a membrane filter having a diameter of 5 μm, in this way, as shown in FIG. 6, shading ink (uv-curable ink) No. 1~No. 12 different in the amount of the reactive polymerized compound are prepared. In addition, in a case of creating lens using a method other than the ink-coating method through inkjet, the filtering process can be omitted.

FIG. 6 is a diagram illustrating the compounding ratio of each kind of ink of No. 1~No. 12. FIG. 6 shows the compounding ratio of the shading ink containing the light-shielding material dispersion, and the dispersant is contained in the C3000 (reactive polymerized compound). In FIG. 6, C2021 manufactured by Daicel Chemical Industries, Ltd. is used as the reactive polymerized compound; ESACURE 1064 manufactured by Lumber party, Inc. is used as the photo-acid-generating agent; Dibutoxyanthracene manufactured by Kawasaki Kasei Co. is used as the sensitizer DBA; and CXC-1738 manufactured by Kusumoto Kasei Co. is used as the thermal acid generator.

Next, the evaluation of the degree of cure is carried out using the obtained ink. As to the evaluation of the degree of cure, the ink is coated, by a bar coater, on a plate made of the same plastic material as the microlens until the ink coating thickness becomes 10 μm. The coated plastic plate is irradiated with the UV light by the UV radiation section 23. The irradiated ink coating film senses the light immediately and the curing of the film is carried out. Herein, such an irradiation condition that the UV light radiation intensity is 2000 mW/cm² (365 nm) and the cumulative light amount is 800 mJ/cm² is set. Further, a heating process is carried out after the UV radiation, and the curing condition is confirmed. Alternatively, the sample is stored at room temperature, and the curing condition over time is confirmed. The determination of the curing condition is carried out through film hardness determination based on pencil hardness. The curing determination results of the shading ink are shown in FIG. 7.

Further, the results obtained by carrying out similar curing determination while changing the coating thickness of the shading ink are shown in FIG. 8. It can be known from the results shown in FIG. 8 that the ink curing characteristic of a thick film to which the thermal acid generator is added is improved. As shown in FIG. 8, the hardness of the ink of No. 1, which is 15 μm thick and is added with no thermal acid generator, is 4B, while the hardness of the ink of No. 5 having a thickness of 15 μm is increased to 2B. This is the evidence that the inner curing is carried out. Further, as to the ink of No. 11 in which the light-shielding material is increased to 10%, the curing up to 3B can be confirmed, which is considered to be the effect of the thermal acid generator. Viewing from the evaluation results shown in FIG. 7 and FIG. 8, the thermal acid generator is desired to be controlled below 2% at least.

The flight performance is not influenced as long as the average particle diameter of the light-shielding material is controlled to be below 300 nm as the uv-curable ink physical properties. Further, it is preferred to set the viscosity value in a range of 5~30 mPa·s at 25 degrees centigrade and set the surface tension value in a range of 22~40 mN/m through the mixture of the monomer, oligomer or surfactant and the like.

Furthermore, it is preferred to set the contact angle between the transparent substrate of the lens array and the uv-curable ink to be below 20 degrees so that the ink spreads naturally to the narrow parts between each lens of the lens array.

In addition, in the examples above, the light-shielding property of the uv-curable ink is changed by changing the pigment concentration. However, the light-shielding property of the uv-curable ink may be changed by changing the material of the light-shielding material. For example, in addition to the carbon black, graphite, inorganic metal pigment and pigment containing titanium oxide may also be used as the light-shielding material, and the light-shielding property of the uv-curable ink may be changed by changing these materials. Alternatively, multiple kinds of pigment used in the light-shielding material may be mixed; in this case, the light-shielding property of the light-shielding film formed by the uv-curable ink may be changed by changing the mixture ratio.

Further, in the example of the first embodiment, the uv-curable ink is coated through an inkjet method, and then the coated uv-curable ink is sequentially subjected to the ultraviolet radiation processing and heating processing to form a light-shielding film. However, the same effect can be achieved through a method, for example, of coating trace amount of liquid with a dispenser, other than the inkjet method.

A Second Embodiment

Figure 9:
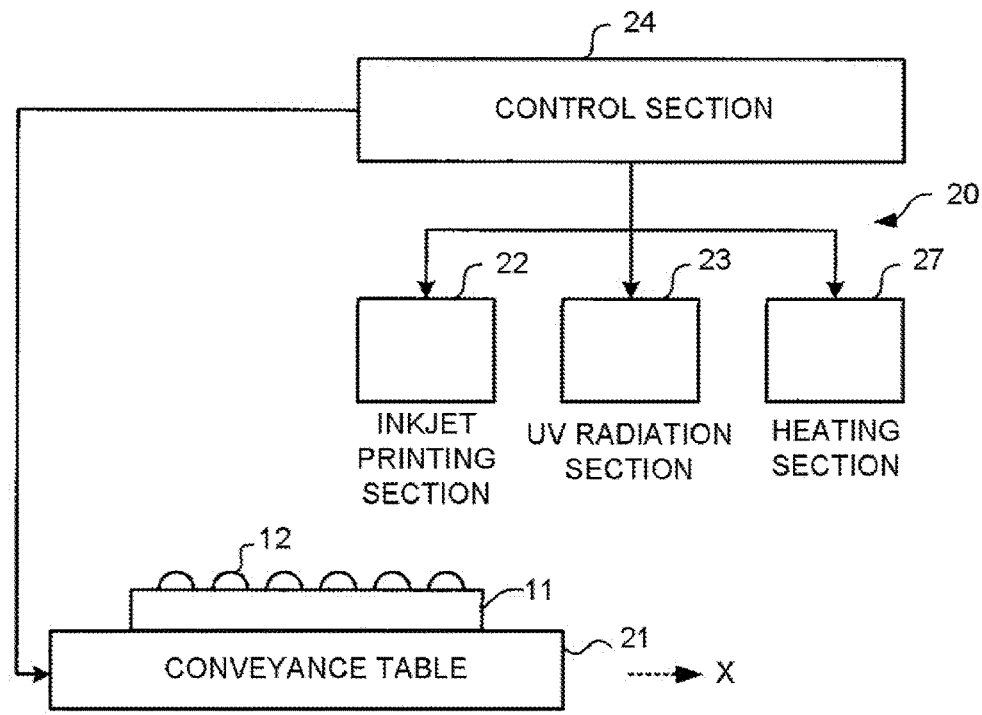
FIG. 9 is a diagram illustrating a light-shielding film forming device according to a second embodiment.

Next, another embodiment for forming the light-shielding film is described with reference to the accompanying drawings. FIG. 9 is a diagram illustrating another constitution of the light-shielding film forming device for the lens array. The light-shielding film forming device shown in FIG. 9 includes the inkjet printing section 22, the UV radiation section 23 and a heating section 27 as the devices for forming, through the inkjet method, the light-shielding film on the lens array 10 including a plurality of lenses 12 on the transparent substrate 11. Further, the control section 24 is arranged to control the inkjet printing section 22, the UV radiation section 23 and the heating section 27.

In the example shown in FIG. 9, carbon black is used as the light-shielding material of the uv-curable ink for forming the light-shielding film, and the light-shielding material is set to 7.5 wt %. Further, as to the UV radiation section 23, the illuminance is set to 2000 mW/cm², the cumulative light amount is set to 400 mJ/cm², and the wavelength is set to 365 nm; and the thickness of the light-shielding film 13 is set to 12 μm. In the inkjet printing section 22, the light-shielding film 13 is printed between each lens 12 of the lens array 10.

Figure 10:
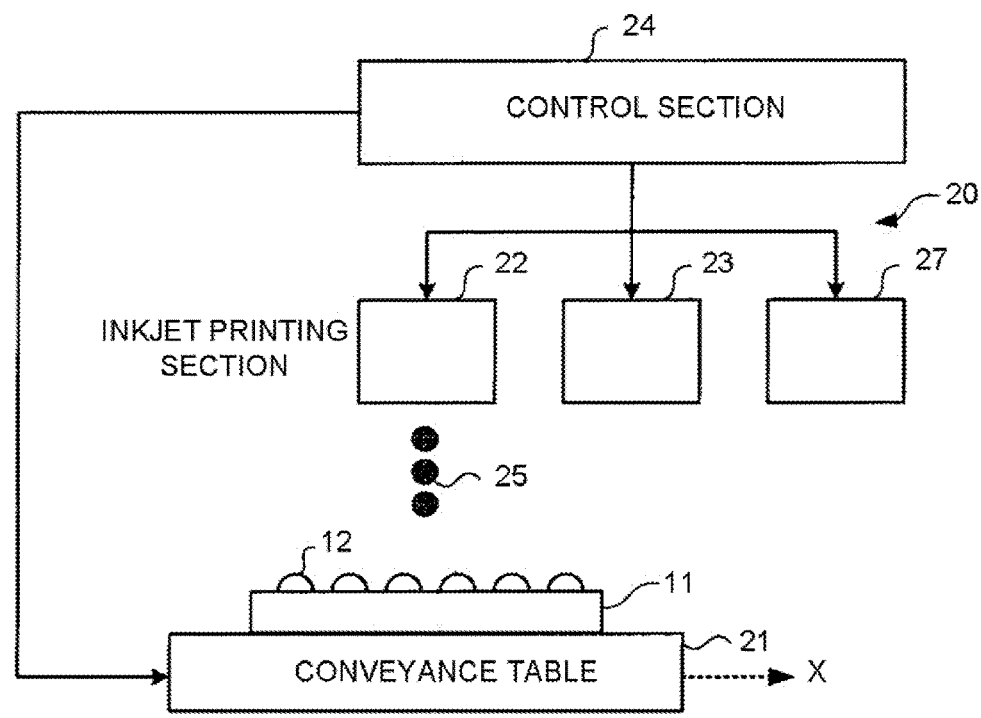
FIG. 10 is a diagram illustrating the ejection of uv-curable ink of the light-shielding film forming device according to the second embodiment.
Figure 11:
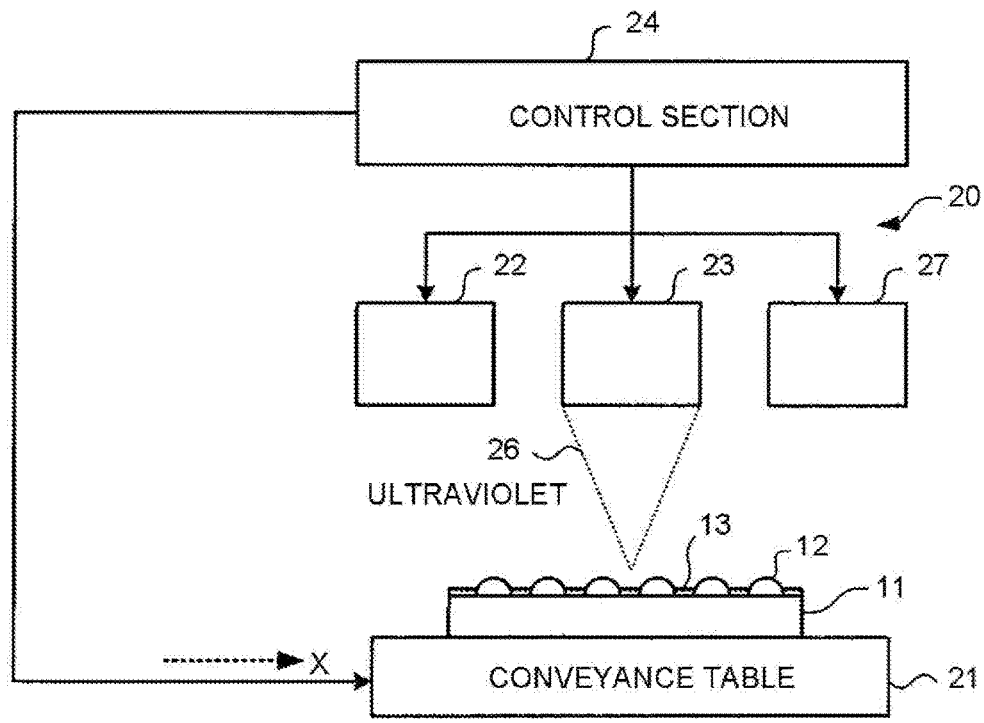
FIG. 11 is a diagram illustrating ultraviolet radiation of the light-shielding film forming device according to the second embodiment.
Figure 12:
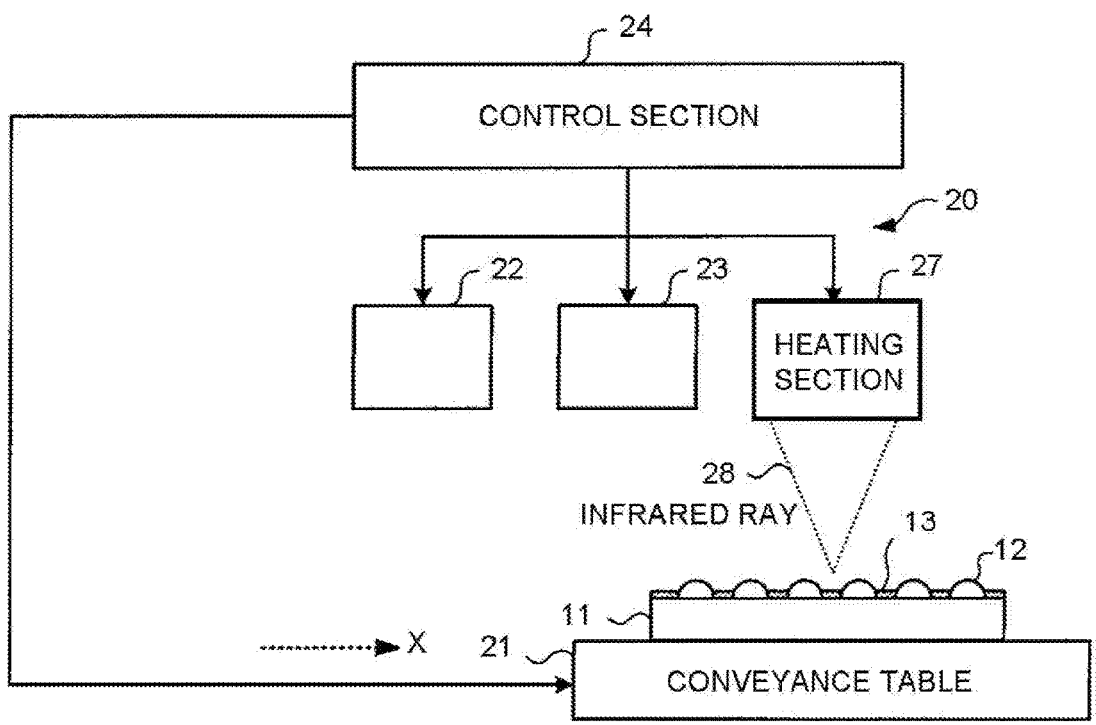
FIG. 12 is a diagram illustrating a heating processing of the light-shielding film forming device according to the second embodiment.

The conveyance table 21 fixedly supports the lens array 10 and moves in a direction indicated by an arrow X to convey the transparent substrate 11 of the lens array 10 towards the position of the inkjet printing section 22, the position of the UV radiation section 23 and then to the position of the heating section 27, as shown in FIG. 10 through FIG. 12. The control section 24 controls the conveyance speed and the conveyance timing of the conveyance table 21.

As shown in FIG. 10, when the transparent substrate 11 is conveyed to the position of the inkjet printing section 22, the control section 14 controls ejection of the uv-curable ink 25 from the inkjet printing section 22. The control section 14 controls the ejection amount of the ink, and the inkjet printing section 22 ejects the uv-curable ink 25 to positions between each lens 12 from above the substrate 11. The control section 14 controls the amount of the ink ejected from the inkjet printing section 22 to positions between each lens 12 so that the thickness of the light-shielding film 13 is, for example, 12 μm. The ejection amount of the ink is controlled by a method of adjusting the voltage applied for ejecting the ink, or a method of changing the number of droplets through a multi-drop printing process.

Next, as shown in FIG. 11, the control section 24 conveys the conveyance table 21 to the position of the UV radiation section 23, and the uv-curable ink 25 coated on the lens array 10 is cured by ultraviolet radiation 26 radiated from the UV radiation section 23. The control section 24 controls the radiation amount of the ultraviolet radiation 26, the wavelength of the ultraviolet radiation and the like. In this way, the light-shielding film 13 is formed at positions between the lenses 12.

Further, as shown in FIG. 12, the control section 24 conveys the conveyance table 21 to the position of the heating section 27, and radiates infrared ray 28 from the heating section 27 to the uv-curable ink to carry out heating processing on the uv-curable ink. In this way, even the inside of the uv-curable ink can be cured.

After the heating processing carried out by the heating section 27, the conveyance table 21 is conveyed to a position away from the heating section 27, and then the film forming processing is terminated.

Figure 13:
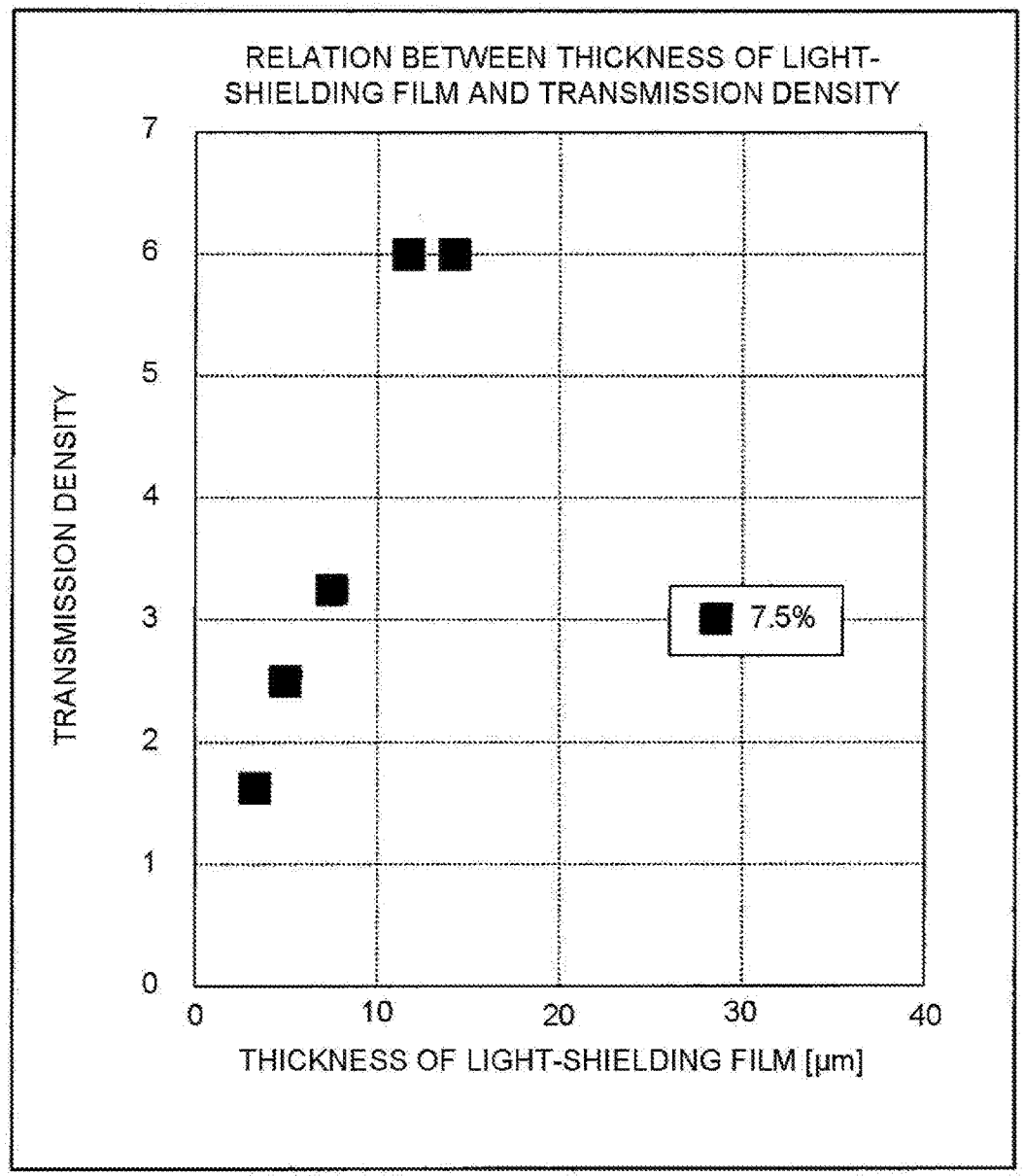
FIG. 13 is a characteristic diagram illustrating the transmission density and the thickness of the light-shielding film according to an embodiment.

FIG. 13 is a diagram illustrating the light-shielding characteristic and the thickness of the light-shielding film 13 in a case in which carbon black is used as the light-shielding material. The uv curing is carried out under a condition that the illuminance is set to 2000 mW/cm², the cumulative light amount is set to 400 mJ/cm² and the wavelength is set to 365 nm. In FIG. 13, the ordinate indicates the transmission density, and the abscissa indicates the thickness of the light-shielding film. In the evaluation of the light-shielding characteristic, the uv-curable ink of which the density of the light-shielding material (carbon black) is set to 7.5 wt % is used. It can be confirmed that sufficient light-shielding property can be achieved in a case in which the light-shielding material is set to 7.5 wt % and the thickness is set to be above 12 µm.

In the second embodiment, it is desired that the time from the ink printing to the ink curing is longer than two seconds so that the ink can spread between the lenses 12. Thus, the conveyance table 21 may be stopped (to wait) for a certain time after the ink is ejected from the inkjet printing section 22.

It is exemplified in the second embodiment that the UV radiation section 23 radiates ultraviolet radiation only from the inkjet printing surface of the lens array 10. However, the part of the conveyance table 21 where the lens array 10 is fixed may be formed by, for example, a glass plate, and ultraviolet radiation may be radiated from the back side of the glass plate to cure the uv-curable ink 25. Further, it is exemplified that the lens array 10 is arranged on the conveyance table 21, and then the uv-curable ink is ejected by the inkjet printing section 22, the ejected uv-curable ink is cured by the UV radiation section 23 and the heating processing is carried out by the heating section 27 to form the light-shielding film 13 while the conveyance table 21 is being moved. However, the light-shielding film 13 may be formed through a method of moving the inkjet printing section 22, the UV radiation section 23 and the heating section 27 with respect to conveyance table 21.

In addition, in examples, the light-shielding property of the uv-curable ink is changed by changing the pigment concentration. However, the light-shielding property of the uv-curable ink may be changed by changing the material of the light-shielding material. At this time, graphite, inorganic metal pigment and pigment containing titanium oxide may also be used as the light-shielding material, in addition to the carbon black, and the light-shielding property of the uv-curable ink may be changed by changing these materials. Alternatively, multiple kinds of pigment used in the light-shielding material may be mixed. In such case, the light-shielding property of the light-shielding film formed by the uv-curable ink may be changed by changing the mixture ratio.

Further, it is exemplified in the second embodiment that the uv-curable ink is coated through an inkjet method, and then the coated uv-curable ink is sequentially subjected to the ultraviolet radiation processing and heating processing to form a light-shielding film. However, the same effect can be achieved through a method, for example, of using a dispenser, other than the inkjet method. Further, as to the heating method, in examples, the infrared ray is radiated with the lens array fixed on the conveyance table. However, the present invention is not limited to this. For example, after the surface of the lens array 10 is cured by the UV radiation section 23, the lens array 10 is removed from the conveyance table 21 and collectively subjected to heating processing by a temperature bath or a hot plate.

(Image Forming Apparatus)

Figure 14:
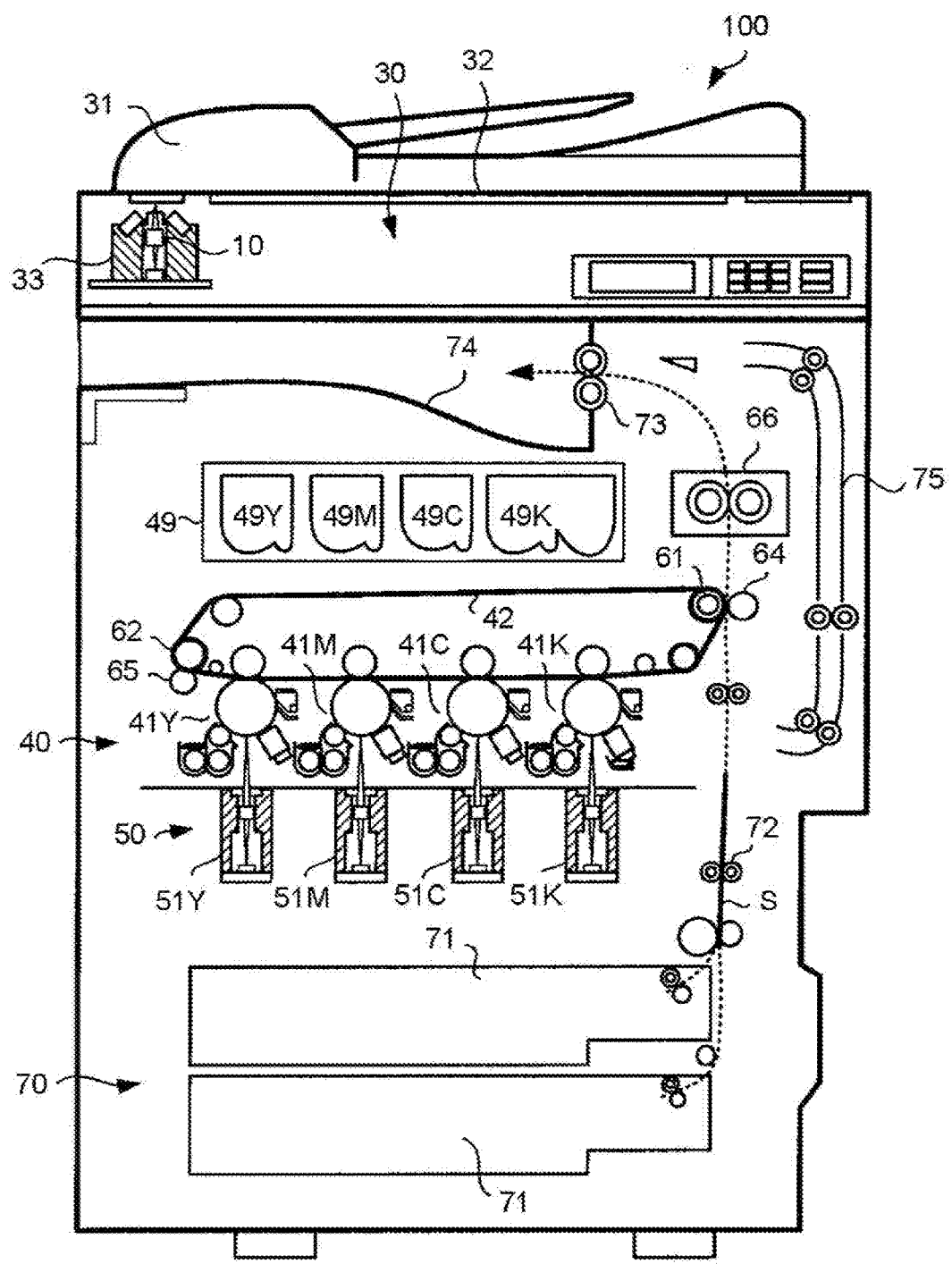
FIG. 14 is a diagram illustrating an example of an image forming apparatus according to an embodiment.

FIG. 14 is a diagram illustrating the constitution of an image forming apparatus serving as an example of an optical device equipped with the lens array 10 according to one embodiment. As shown in FIG. 14, an image forming apparatus 100 comprises a scanner section (image reading section) 30 for reading an image on a document and the like, a printer section (image forming section) 40 for processing the image data generated by the scanner section 30 and the like and forming an image on paper, and a paper feed section 70 for feeding paper to the printer section 40.

The scanner section 30, arranged at the upper portion of the image forming apparatus 100, reads the document fed by an automatic document feeder 31 or the document placed on a document table 32 to generate image data, and is equipped with an image sensor 33.

Figure 15:
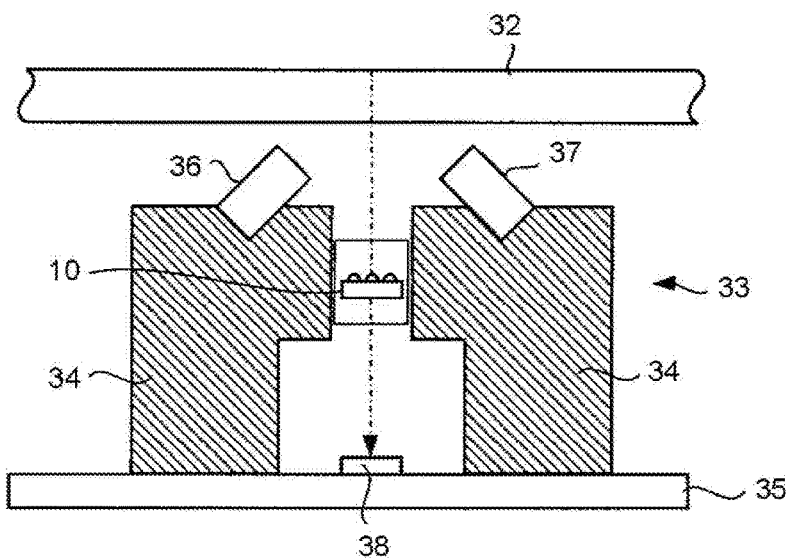
FIG. 15 is a diagram illustrating a schematic of an image reading section of the image forming apparatus according to an embodiment.

FIG. 15 is an enlarged cross-sectional view illustrating the image sensor 33 of the image reading section. The image sensor 33 is a one-dimensional sensor arranged in a horizontal scanning direction (depth direction as shown in FIG. 7 and FIG. 8), and is equipped with housings 34. The housing 34 is arranged on the substrate 35, and at the upper portions of the housings 34 at the side of the document table 32 are arranged two light sources (light-emitting elements) 36 and 37 that extend in the horizontal scanning direction to radiate light towards the document.

The light sources 36 and 37 may be, for example, LED, fluorescent tube, xenon tube, cold-cathode tube or organic EL and the like-type light sources. The lens array 10 is supported between the light sources 36 and 37 arranged at the upper portions of the housing 34, and a sensor 38 comprising a CCD or a CMOS device is arranged on the substrate 35 at the bottom of the housing 34.

The light sources 36 and 37 irradiate the image reading position of the document on the document table 32, and the light reflected by the image reading position enters the lens array 10. The lens array 10 functions as an erecting equal-magnification lens, and the light entering the lens array 10 is emitted from the light emission surface of the lens array 10 and then focused on the sensor 38. The focused light is converted into an electric signal by the sensor 38, and the electric signal is transmitted to a memory section (not shown) of the substrate 35.

The printer section 40, arranged at the center portion of the image forming apparatus 100, is provided with, for example, image forming sections 41Y, 41M, 41C and 41K of yellow (Y), magenta (M), cyan (C) and black (K) color, and an exposure device 50 including scanning heads 51Y, 51M, 51C and 51K corresponding to each of these image forming sections. The image forming sections 41Y, 41M, 41C and 41K are arranged below an intermediate transfer belt 42 side by side from the upstream side to the downstream side.

Figure 16:
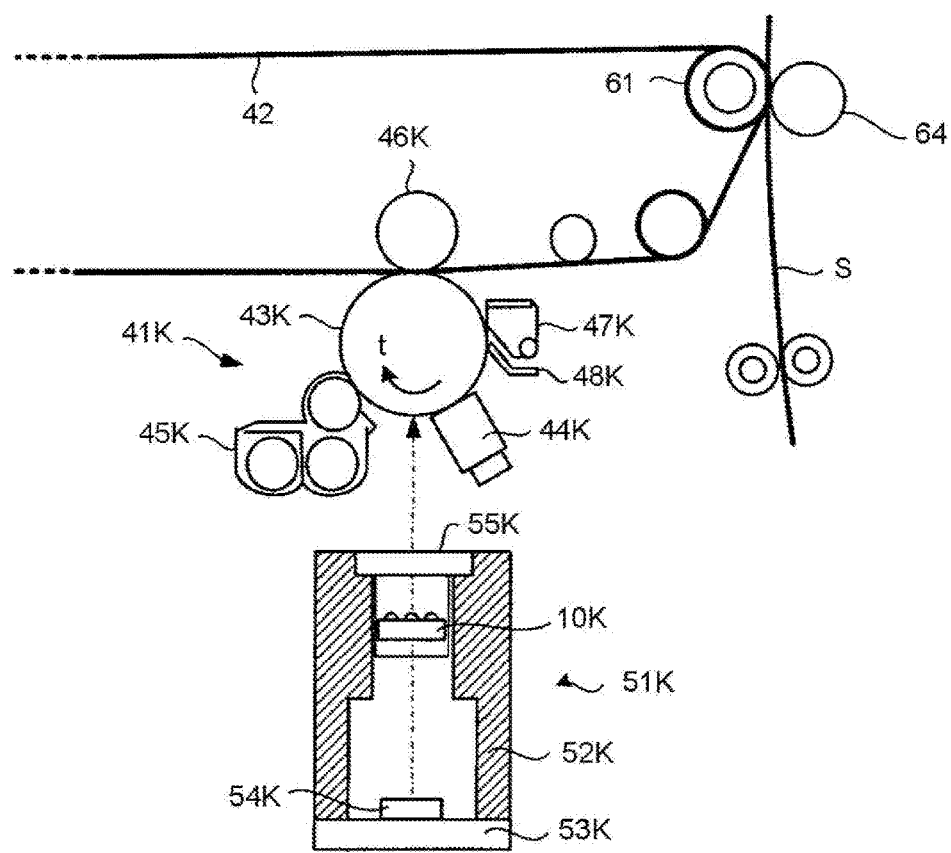
FIG. 16 is a diagram illustrating a schematic of the image forming section of the image forming apparatus according to an embodiment.

FIG. 16 is an enlarged diagram illustrating the constitution of the image forming section 41K within the image forming sections 41Y, 41M, 41C and 41K. In addition, the image forming sections 41Y, 41M, 41C and 41K are structurally identical to each other, thus, the image forming section 41K is described as a representative example in the following description.

As shown in FIG. 16, the image forming section 41K includes a photoconductive drum 43K serving as an image carrier. An electrostatic charger 44K, a developing device 45K, a primary transfer roller 46K, a cleaner 47K, a blade 48K and the like are arranged around the photoconductive drum 43K along a rotation direction t. Light is emitted from the scanning head 51K to the exposure position of the photoconductive drum 43K to form an electrostatic latent image on the photoconductive drum 43K.

The electrostatic charger 44K uniformly charges the entire surface of the photoconductive drum 43K. The developing device 45K supplies two-component developing agent containing black toner and carrier to the photoconductive drum 43K through a developing roller applied with developing bias. The cleaner 47K removes the toner left on the surface of the photoconductive drum 43K with the blade 48K.

Next, the constitution of the scanning head 51K of the exposure device 50 is described. The scanning head 51K is arranged facing the photoconductive drum 43K. The photoconductive drum 43K rotating at a preset rotation speed can store the charge at the surface thereof, and the light from the scanning head 51K is radiated to the photoconductive drum 43K to expose the photoconductive drum 43K to form the electrostatic latent image on the surface of the photoconductive drum 43K.

The scanning head 51K includes a lens array unit 10K that is supported by a holding member 52K. Further, a support body 53K is arranged at the bottom of the holding member 52K, and light-emitting elements 54K serving as light sources such as LED are arranged on the support body 53K. The light-emitting elements 54K are arranged linearly at equal intervals in the horizontal scanning direction.

Further, a substrate (not shown) including a driver IC for controlling the light emission of the light-emitting element 54K is arranged in the support body 53K. The driver IC constituting a control section issues a control signal of the scanning head 51K based on the image data, and the light-emitting elements 54K emit light for a predetermined light amount according to the control signal. The light emitted from the light-emitting element 54K enters and passes through the lens array unit 10K and then is focused on the photoconductive drum 43K. In this manner, an image is formed on the photoconductive drum 43K. Further, a cover glass 55K is arranged at the upper portion (light emission side) of the scanning head 51K.

As shown in FIG. 14, a toner cartridge 49 for supplying toner to the developing devices 45Y, 45M, 45C and 45K is arranged at the upper portion of the image forming sections 41Y, 41M, 41C and 41K. The toner cartridge 49 includes toner cartridges 49Y, 49M, 49C and 49K of yellow (Y), magenta (M), cyan (C) and black (K) color.

The intermediate transfer belt 42 is rotated cyclically. The intermediate transfer belt 42 is stretched by a driving roller 61 and a driven roller 62. Further, the intermediate transfer belt 42 faces and contacts with the photoconductive drums 43Y, 43M, 43C and 43K. A primary transfer voltage is applied by the primary transfer roller 46K to the position of the intermediate transfer belt 42 facing the photoconductive drum 43K to primarily transfer the toner image on the photoconductive drum 43K to the intermediate transfer belt 42.

A secondary transfer roller 64 is arranged facing the driving roller 61 that stretches the intermediate transfer belt 42. When the paper S is passed through the space between the driving roller 61 and the secondary transfer roller 64, a secondary transfer voltage is applied to the paper S by the secondary transfer roller 64. In this way, the toner image on the intermediate transfer belt 42 is secondarily transferred to the paper S. A belt cleaner 65 is arranged nearby the driven roller 62 of the intermediate transfer belt 42.

The paper feed section 70 includes a plurality of paper feed cassettes 71 for storing paper of various sizes. A conveyance roller 72 for conveying the paper S taken out from the paper feed cassette 71 is arranged between the paper feed cassette 71 and the secondary transfer roller 64. Further, a fixing device 66 is arranged at the downstream side of the secondary transfer roller 64.

A conveyance roller 73 is arranged at the downstream side of the fixing device 66. The conveyance roller 73 discharges the paper S to a paper discharge tray 74. Further, a reversal conveyance path 75 is arranged at the downstream side of the fixing device 66. The reversal conveyance path 75, which reverses the paper S and guides the paper S towards the secondary transfer roller 64, is used in a case of duplex printing.

In accordance with the embodiments described above, the light-shielding film is formed using the uv-curable ink and, in this manner, both the light-shielding property of the light-shielding film and the cured film performance can be achieved. Further, an image forming apparatus equipped with the lens array including a light-shielding film formed by the uv-curable ink can be provided.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A scanner, comprising:
a document table;
a light source for irradiating a document on the document table at an image reading position;
a lens array for receiving light reflected by the document on the document table at the image reading position; and
a sensor configured to receive light transmitted through the lens array after being reflected by the document placed on the document table;
wherein the lens array comprises:
a plurality of lenses disposed on a transparent substrate; and
a light-shielding film disposed on the transparent substrate around the plurality of lenses,
wherein the light-shielding film comprises a cured uv-curable ink containing a thermal acid generator that generates acid when heated to promote curing of the uv-curable ink; and
wherein the thermal acid generator has a thermal decomposition point below a glass transition point of a material of the plurality of lenses.

2. The scanner according to claim 1, wherein the cured uv-curable ink comprises an ultraviolet radiation cured uv-curable ink.

3. The scanner according to claim 1, wherein the cured uv-curable ink comprises an ultraviolet radiation cured and heated uv-curable ink.

4. The scanner according to claim 1, wherein the plurality of lenses and the light-shielding film are disposed on one surface of the transparent substrate.

5. The scanner according to claim 1, wherein the plurality of lenses and the light-shielding film are disposed on both sides of the transparent substrate.

6. The scanner according to claim 1, wherein the transparent substrate comprises a glass plate.

7. The scanner according to claim 1, wherein the transparent substrate comprises a resin plate.

8. An image forming apparatus, comprising:
a document table on which a document can be placed;
a light source configured to emit light through the document table towards the document;

a first plurality of lenses on a first transparent substrate and configured to receive light emitted by the light source after reflection off the document;

a sensor to receive focused light from the first plurality of lenses; and a first light-shielding film on the first transparent substrate around the first plurality of lenses, wherein the first light-shielding film comprises a cured uv-curable ink containing a thermal acid generator; and wherein the thermal acid generator has a thermal decomposition point below a glass transition point of a material of the first plurality of lenses.

9. The image forming apparatus according to claim 8, wherein
the cured uv-curable ink comprises an ultraviolet radiation cured uv-curable ink.

10. The image forming apparatus according to claim 8, wherein
the cured uv-curable ink comprises an ultraviolet radiation cured and heated uv-curable ink.

11. The image forming apparatus according to claim 8, wherein the first plurality of lenses and the light-shielding film are disposed on one surface of the transparent substrate.

12. The image forming apparatus according to claim 8, further comprising:

a second plurality of lenses on a second transparent substrate;

a second light-shielding film on the second transparent substrate around the second plurality of lenses;

a light-emitting element configured to emit light through the second plurality of lenses; and a photoconductive drum configured to receive focused light emitted by the light-emitting element and transmitted through the second plurality of lenses; wherein the second light-shielding film comprises a second cured uv-curable ink containing a second thermal acid generator; and wherein the second thermal acid generator has a thermal decomposition point below a glass transition point of a material of the second plurality of lenses.

13. The image forming apparatus according to claim 8, wherein the transparent substrate comprises a glass plate.

14. The image forming apparatus according to claim 8, wherein the transparent substrate comprises a resin plate.

* * * * *